United States Patent
Fiorentini et al.

[11] Patent Number: 6,079,867
[45] Date of Patent: Jun. 27, 2000

[54] SELF-CLEANING, MIXING APPARATUS AND METHOD FOR THE PRODUCTION OF POLYURETHANE FORMULATIONS

[75] Inventors: Carlo Fiorentini, Saronno; Alberto Bonansea, Seregno, both of Italy

[73] Assignee: Afros S.P.A., Pertusella, Italy

[21] Appl. No.: 09/082,725

[22] Filed: May 21, 1998

[30] Foreign Application Priority Data

May 22, 1997 [IT] Italy ................................. MI97A1207
Jan. 30, 1998 [IT] Italy ................................. MI98A0185

[51] Int. Cl.⁷ ................................. B01F 5/04; B01F 15/02
[52] U.S. Cl. ................................. 366/159.1; 366/162.5; 422/133
[58] Field of Search ................................. 366/159.1, 162.4, 366/162.5, 167.1, 173.1; 422/133–135

[56] References Cited

U.S. PATENT DOCUMENTS

| | | |
|---|---|---|
| 3,706,515 | 12/1972 | Keuerleber et al. . |
| 3,799,199 | 3/1974 | Rumpff . |
| 3,912,234 | 10/1975 | Peter . |
| 3,933,312 | 1/1976 | Fries . |
| 3,975,128 | 8/1976 | Schluter . |
| 4,053,283 | 10/1977 | Schneider et al. . |
| 4,096,585 | 6/1978 | Fiorentini . |
| 4,332,335 | 6/1982 | Fiorentini . |
| 4,397,407 | 8/1983 | Skoupi et al. ........................ 366/162.4 |
| 4,473,531 | 9/1984 | Macosko et al. . |
| 4,608,233 | 8/1986 | Fiorentini . |
| 5,063,027 | 11/1991 | Schneider ................................. 422/133 |
| 5,270,014 | 12/1993 | Bauer et al. . |
| 5,540,497 | 7/1996 | Addeo et al. ......................... 366/159.1 |

FOREIGN PATENT DOCUMENTS

| | | |
|---|---|---|
| 2107438 | 4/1994 | Canada . |
| 0 258 688 | 3/1988 | European Pat. Off. . |
| 504 874 A1 | 9/1992 | European Pat. Off. . |
| 513 938 A2 | 11/1992 | European Pat. Off. . |
| 0 594 981 A1 | 5/1994 | European Pat. Off. . |
| 0 763 411 A2 | 3/1997 | European Pat. Off. . |
| 21 17 533 | 10/1972 | Germany . |
| 20 65 841 | 5/1976 | Germany . |
| 44 01 560 A1 | 7/1995 | Germany . |
| 2 036 586 | 7/1980 | United Kingdom . |

Primary Examiner—Charles E. Cooley
Attorney, Agent, or Firm—Pillsbury Madison & Sutro Intellectual Property Group

[57] ABSTRACT

A high-pressure self-cleaning mixing apparatus adapted to mix at least first and second reactive polyurethane-forming components and feed the mixed components to a mold is disclosed. The apparatus includes at least a mixing chamber, first and second feed passages, first and second recycle passages, and a cleaning member having at least first and second longitudinally-extending recycle grooves spaced from each other. The cleaning member is movable between an open position in which the first feed passage radially feeds the first polyurethane-forming component to the mixing chamber and a closed position in which the first longitudinally-extending recycle groove communicates the first feed passage with the first recycle passage to recycle the first polyurethane-forming component instead of feeding the first polyurethane-forming component to the mixing chamber. The second feed passage may be communicated with a longitudinally-extending passage of the cleaning member to permit the second polyurethane-forming component to be fed into the mixing chamber along an axial direction of the mixing chamber. A valve member may be provided to prevent the flow of the second polyurethane-forming component to the mixing chamber by recycling the second polyurethane-forming component to the second recycle passage. Spacing between the first and second grooves seals the first feed and recycle passages from the second feed and recycle passages.

24 Claims, 3 Drawing Sheets

SELF-CLEANING, MIXING APPARATUS AND METHOD FOR THE PRODUCTION OF POLYURETHANE FORMULATIONS

BACKGROUND OF THE INVENTION

1. Field of the Invention

The present invention relates to the preparation of polyurethane mixtures, and more particularly the invention is directed to a high-pressure mixing apparatus, of the self-cleaning type, and to a method suitable for the production of polyurethane mixtures with two or more reactive components. Although the method and apparatus according to the present invention are suitable for preparation of any type of polyurethane mixture for making flexible, semi-rigid and rigid foams, according to some aspects disclosed herein, the invention is particularly directed to the preparation of mixtures starting from a total pre-polymer or from polyurethane chemical components having different viscosities.

2. Description of the Related Art

In the preparation of polyurethane mixtures for the production of molded parts, use is made of formulations comprising two or more chemically reactive primary components, suitable for producing a polymer, using a high-pressure mixing apparatus of the self-cleaning type. According to conventional techniques, stoichiometrically metered quantities of the primary components, such as a polyol and an isocyanate, with various additives, are fed separately and injected radially in opposite or angularly spaced positions of a mixing chamber, wherein the various streams frontally collide with one another with sufficiently high kinetic energy to cause strong atomization and total mixing.

As schematically shown in FIGS. 1 and 2 of the accompanying drawings, which represent the general state of the art, in the case in which the mixture is obtained from a polyol and an isocyanate which are premixed with various additives, the two reactant streams are fed into the mixing chamber 13 of a self-cleaning mixing apparatus 10, via diametrically opposed conduits or injection nozzles 11 and 12, between which an angular spacing of approximately 180° exists. This angular spacing is represented by the double arrow 14 in FIG. 2.

Examples of these mixing devices can be found in the literature, from which the following are mentioned by way of example: U.S. Pat. No. 3,706,515, U.S. Pat. No. 3,975,128, U.S. Pat. No. 4,096,585 and U.S. Pat. No. 4,332,335, the complete disclosures of each of which are incorporated herein by reference.

In these apparatuses, during the recycling phases, the necessary seals are provided by narrow dimensions between the external surface of the cleaning member 15 and the internal diameter of the hole defining the mixing chamber, the large angular spacing between the feeding conduits 11 and 12, and the spacing between corresponding recycling grooves normally provided in opposite positions on the same cleaning member. The dimensions can be approximated to within a few microns.

In general, the high viscosity of the primary polyurethane components used in conventional formulations contributes to improving the sealing conditions. Specifically, the high viscosity makes any seepage of one component into the other through the very narrow gap between the inner wall of the mixing chamber 13 and the outer surface of the cleaning member 15 difficult, even during the recycling phase when the same cleaning member is moved fully forwards.

Moreover, effective sealing between the primary components during the recycling phases is a critical condition for continued operation of the apparatus. In fact, any contact between the polyol and the isocyanate, or more generally between chemically reactive components during the recycling phases, could lead to the formation and/or deposition of solid particles on the inner surfaces of the mixing apparatus, as well as in the recycling circuits. Such solid particles can damage the apparatus and/or require it to be removed from service for cleaning and repairs.

In an attempt to improve the mixing conditions, as schematically shown in FIG. 3, it has been proposed to slant the feeding conduits 11 and 12 for the polyurethane components to face towards the bottom or a wall of the mixing chamber 13. This technique is shown, for example, in U.S. Pat. No. 3,933,312 and U.S. Pat. No. 4,473,531, the complete disclosures of which are incorporated herein by reference.

However, in this case too, the two primary components are always injected in a substantially radial plane, through conduits or nozzles which open directly in the wall of the mixing chamber 13. Any seepage of one polyurethane component into another, during a recycling phase, is once again prevented not only by a narrow gap between the contacting surfaces of the cleaning member 15 and the mixing chamber 13, but also by a sufficient angular spacing between the conduits 11 and 12.

In other cases, in particular in the preparation of multi-component polyurethane mixtures with a chamber such as shown in FIG. 4, where three or more primary components are fed at high pressure into a mixing chamber 13 through respective conduits 16, 17, 18 and 19, the angular spacing between adjacent conduits is considerably reduced. In FIG. 4, this angular spacing is equal to an angle of 90° or less, if account is also given to the diameters of the feed conduits themselves. In all cases this distance, measured on the contact interface between the mixing chamber 13 and the cleaning member 15, is reduced to about ten millimeters approximately, or less, and is totally insufficient for ensuring the necessary seal, considering that the various polyurethane components are normally recycled at high pressures, on the order of 15–20 MPa (150–200 atm) or higher.

The streams of the various primary components which collide at high speed in the mixing chamber 13 generally have comparatively high flow rates, that is, there is sufficient kinetic energy for ensuring good and complete mixing. Accordingly, in the cases in which the pressure of recycling of the components is considerably high, the angular spacing between the individual conduits and the corresponding recycling grooves is inadequate to ensure sufficient sealing, such as to prevent the seeping of one component into another. Use therefore has to be made of special techniques, such as for example the formation of appropriate longitudinal seals on the cleaning member of the mixing chamber 13, as schematically denoted by reference numeral 20 in FIG. 4.

Examples of longitudinal seals on the cleaning member are represented in DE 2,117,533.

According to this technology, the necessary seals between the feed conduits and the respective recycling grooves for the components are obtained by forming longitudinal slots in the cleaning member of the mixing chamber. The slots are later filled with an appropriate resin, by adopting a method which is somewhat complex and difficult to perform directly in the place of these mixing apparatuses.

Moreover, the resin filling technique for the sealing slots, due to the high wear, has an extremely limited life span, equal to a few working days of the apparatus. Therefore, the resin filling has to be renewed frequently, with subsequent inconvenience and interruptions of the production cycle.

The seal between conduits for feeding the components, between the various recycling grooves respectively, in certain cases is more critical when a total pre-polymer or a polyurethane formulated from TDI is used, i.e., when one of the primary chemical components has a considerably low viscosity or a viscosity that is at least lower than the viscosity of the other component, for example, on the order of a few centipoises.

In general, therefore, the art has always been oriented towards feeding all the primary components in radial directions substantially in the same plane and perpendicular to the longitudinal axis of the mixing chamber through feeding conduits or nozzles which open directly in the side walls of the mixing chamber. Consequently, the sealing during the recycling phase is critical for the reasons already explained.

The so-called "partial pre-polymer" technique has also been well known. According to this technique, only a reduced quantity of an isocyanate is pre-mixed with a polyol, without the cross-linking agent, to obtain a pre-polymer. The pre-polymer thus obtained, and the remaining part of the isocyanate stoichiometrically necessary to complete the polyurethane mixture, are successively injected with additives, such as reaction water, and a cross-linking agent into the mixing chamber of a common mixing device.

Generally, mixing apparatuses of this type have proven to be highly efficacious and suitable to provide good mixing only when the various streams of the components impinging into the mixing chamber have comparatively high yet slightly different flow rates, since all streams must have a sufficiently high kinetic energy to ensure intimate mixing.

Presently, a new technology is being considered which is based on the use of some "total" polyurethane pre-polymers which should be suitably mixed with a metered quantity of a primary reactive additive, for example, water for the production of the $CO_2$ necessary for foaming, and a suitable agent for the final reticulation or cross-linking.

According to this new technique, a polyol and an isocyanate are pre-mixed in the quantities stoichiometrically necessary to react, to obtain a "total pre-polymer" as defined herebelow. Subsequently, the pre-polymer is mixed with reaction water and a catalyst for the final reticulation. For the purpose of the present invention, the term "total pre-polymer" is used and understood to mean a pre-polymer obtained by pre-mixing stoichiometrically metered quantities of a polyol and an isocyanate with non-reactive additives which are common in the formulations of polyurethane formulations.

This new technology has proven to be efficient, since it allows for the production of polyuretheres with high molecular weights, included in a very limited range not obtainable with the conventional mixing technologies because of the violence and speed of the chemical reaction which occurs among the various chemical components. Therefore according to this total pre-polymer technology, the characteristics of the produced foam are remarkably improved.

Presently, there is a problem in developing and setting up new processes and apparatuses which allow for high-pressure mixing with this new total pre-polymer technology.

Many attempts were carried out to mix a total pre-polymer with a primary additive comprising water and a reticulation catalyst, making use of high-pressure mixing apparatuses of the opposing jet type. However these attempts have produced poor results. In practice, it was not possible to homogeneously mix the primary additive, probably because of its little kinetic energy, since its flow rate constitutes a portion which is in a smaller percentage than the pre-polymer flow rate. Generally, the weight ratio between the reaction water added to the cross-linking catalyst, and the pre-polymer, is indicatively in the range of 10–15% or less. Therefore the catalyst stream has a very low energy, totally insufficient to mix with the pre-polymer. As a consequence, the catalyst is only partially mixed in the pre-polymer and the produced polyurethane foam is defective or for most applications commercially unacceptable.

In the attempt to solve this problem and in the research of a suitable apparatus, tests have been carried out by using the same cleaning member of the mixing chamber as feeding means for the primary additive. The results thus obtained were encouraging and suggested further investigations with this specific testing.

For certain applications it has also been proposed to feed a component axially in the mixing chamber. This is described for example in GB-A-2,036,586, U.S. Pat. No. 4,053,283, U.S. Pat. No. 4,608,233 or in EP-A-594 981, the complete disclosures of which are incorporated herein by reference. In particular GB-A-2,036,586 describes a mixing device for the production of polyisocyanates, or more generally for mixing chemically reactive substances, which uses a special mixing chamber with a bell shape, in which the streams collide in directions substantially at right angles one with another. This mixing device is therefore totally lacking in any mechanical self-cleaning, and the conduits for feeding the various chemical components for mixing are provided directly in the body of the same mixing device. Moreover, a similar mixing device in practice is suitable for continuous mixing processes, for which the control of the stoichiometric ratios between primary components to be mixed is, initially, less critical than discontinuous mixing processes used in molding polyurethane. Therefore, a similar device is wholly inadequate for discontinuous production of polyurethane mixtures, where the stoichiometric control of the mixture components must be strictly ensured right from the start, in theory from the first drop of mixture supplied into a mold.

For this purpose, for some time high-pressure mixing apparatuses of the self-cleaning type, the same cleaning member of the mixing chamber also performs a valve function for simultaneous opening and closing of the injection nozzles, as well as recycling of the various components.

However, in traditional self-cleaning mixing devices, the various nozzles for injecting the components are arranged radially or variously oriented in relation to the longitudinal axis of the mixing chamber, maintaining practically a circumferential arrangement, in the manner discussed previously with reference to FIGS. 1 to 4 and shown in the numerous documents mentioned previously.

Unlike GB-A-2,.036,586, U.S. Pat. No. 4,053,283, U.S. Pat. No. 4,608,233 and EP-A-594 981 show self-cleaning high-pressure mixing devices in which the cleaning member of the mixing chamber is provided with a longitudinal hole which opens axially at the front end in the mixing chamber for feeding a nucleation gas or an auxiliary, not chemically reactive, component.

In particular, in U.S. Pat. No. 4,053,283 a hole for feeding nucleation air extends along the entire cleaning member to lead into a rear air chamber. United States Pat. No. 4,608, 223 and EP-A-594 981 also each describes a high-pressure, self-cleaning mixing apparatus, in which the longitudinal hole of the cleaning member is only used for feeding an auxiliary component, such as a dye substance, a releasing agent or anything else for which strict batching of the quantities fed is less critical, or has no effect on the resulting mixture nor on the features of the molded parts. In the aforementioned documents, the polyurethane components, such as a polyol and an isocyanate, are therefore always fed into the mixing chamber by radial jets, in a wholly conventional manner.

From the above, it is clear that, despite the fact that it has been proposed to use an axial hole in the cleaning member of the mixing chamber for feeding a component, the conventional art relating to self-cleaning high-pressure mixing devices has always been oriented towards feeding the primary polyurethane components radially through the facing nozzles which open directly in the wall of the same mixing chamber. Therefore, in cases in which it is necessary to place several injection nozzles closer together, the need arises to use special techniques for the necessary sealing to avoid the risks and disadvantages referred to previously.

Furthermore, contrary to the expectations and experiences associated with conventional high-pressure mixing apparatuses, by testing the total pre-polymer technique it has been found that axially feeding the primary chemically reactive agent into the mixing chamber by a flow crossed with the pre-polymer, and in particular feeding the primary additive axially in the mixing chamber from a slightly rear or back position, very close to the inlet pre-polymer nozzle, at a space equal to or less than the space between the pre-polymer injection nozzle and the outlet of the mixture from the mixing chamber, permits an intimate and homogeneous mixing to be obtained. The stoichiometric ratios of the whole mass of the polyurethane mixture thus formed were respected.

However, during testing, in connection with results generally acceptable, sometime defects were found in the produced foams. The defects were believed to be caused by a non-homogeneous mixing of the cross-linking agent. Upon examination of the problem, a conclusion was reached that the non-homogenous mixing is caused by several factors, including progressive clogging of the feeding hole due to the formation of hard foam scales, difficulty in synchronizing feeding of the various streams at the start of each mixing phase, and interruption of the streams when the system has to pass to a high-pressure re-cycle condition.

SUMMARY OF THE INVENTION

It is, therefore, an object of the present invention to provide a high-pressure mixing apparatus, of the self-cleaning type, for the production of polyurethane mixtures to be fed into a mold, which is suitable for solving or considerably reducing the above-mentioned problems and ensuring effective mixing and a strict stoichiometric control of the various components from the commencement of their feed into the mixing chamber.

A further object of the invention is to provide high-pressure mixing apparatus, of the self-cleaning type, which is suitable for producing multi-component polyurethane mixtures, and which also allows feeding and recycling conditions at sufficiently high pressures, with sealing suitable for preventing any seeping of one component into the recycling circuit of another. The polyurethane mixture may include, for example toluenediisocyanate (TDI) based or of total pre-polymer type, characterized by primary components having low viscosity, e.g., on the order of a few centipoises or tens of centipoises, and/or diphenyl-methane-diisocyanate (MDI) based, characterized by primary components of greater viscosity, e.g., on the order of a few hundred centipoises.

A further object of the present invention is to provide a method for the production of polyurethane mixtures starting from a total pre-polymer.

A further object again of the present invention is to provide a high-pressure mixing apparatus suitable for allowing a strict control of the stoichiometric ratio between the chemical components, during mixing, and a synchronism of start and stop of the various components, by the same mixing apparatus, by using a sole source of pressurized fluid to selectively control the feeding and subsequent injection into the mixing chamber of the chemicals to produce a polyurethane foam having a good quality.

The above objects can be achieved by a high-pressure self-cleaning mixing apparatus adapted to mix at least first and second reactive polyurethane-forming components and feed the mixed components to a mold. The apparatus includes a body having a mixing chamber, first and second feed passages and first and second recycle passages, and a guide hole comprising the mixing chamber for receiving a cleaning member with at least first and second longitudinally-extending recycle grooves spaced from each other. The cleaning member is movable between an open position in which the first feed passage radially feeds the first polyurethane-forming component to the mixing chamber and a closed position in which the first longitudinally-extending recycle groove communicates the first feed passage with the first recycle passage to recycle the first polyurethane-forming component instead of feeding the first polyurethane-forming component to the mixing chamber. The second feed passage may be communicated with a longitudinally-extending passage to permit the second polyurethane-forming component to be fed into the mixing chamber along an axial direction of the mixing chamber. A valve member may be provided to prevent the flow of the second polyurethane-forming component to the mixing chamber by recycling the second polyurethane-forming component to the second recycle passage. Spacing between the first and second grooves seals the first feed and recycle passages from the second feed and recycle passages.

According to another aspect of the invention, the cleaning member of the mixing chamber comprises a valve element slidable inside the longitudinal hole, as well as control means actuatable selectively and in sequence, comprising hydraulic actuators coaxially arranged and operatively connected to a single pressurized fluid source.

According to another aspect of the invention, a method is provided for the production of a polyurethane mixture with a high-pressure self-cleaning mixing apparatus from at least one total pre-polymer and at least one component which is chemically reactive component with the pre-polymer and has a comparatively lower flow rate. The method comprises radially injecting the pre-polymer through a feed passage and into a mixing chamber in which at least a first injection nozzle opens. The method further comprises axially injecting the chemically-reactive component through a longitudinally-extending passage of a reciprocable cleaning member and into the mixing chamber. The cleaning member is movable between an advanced closed position and a retracted open position. When the cleaning member is in its open position, the total pre-polymer is radially fed by the first injection nozzle into the mixing chamber, and the reactive component is axially injected into the mixing chamber through the longitudinally-extending passage of the cleaning member in synchronism with and orthogonally to the pre-polymer flow. When the cleaning member is in its closed position, the first injection nozzle is prevented from injecting the pre-polymer in to the mixing chamber.

According to another aspect of the invention, a high-pressure self-cleaning mixing apparatus is provided for the production of a polyurethane mixture from first and second chemical components. The apparatus comprises a mixing chamber provided with at least one radial injection nozzle for a first chemical component, the mixing chamber opening into a delivery channel angularly arranged with respect to the mixing chamber. The apparatus further comprises a cleaning member movable in the mixing chamber between an advanced position to close the radial injection nozzle and a retracted position to open the injection nozzle and permit the delivery of the first chemical component to the mixing chamber. The cleaning member comprises a longitudinal duct axially opening into the mixing chamber to permit communication between an inlet side hole and the mixing chamber for delivery of a second chemical component. A valving member coaxially arranged in the longitudinal duct of the cleaning member permits the flow of the second chemical component to the mixing chamber to be controlled. Coaxially arranged control means operatively connectable to a pressurized fluid source synchronously operates the valving member and the cleaning member between the advanced and retracted positions.

BRIEF DESCRIPTION OF THE DRAWINGS

These and further features of the mixing apparatus and method according to this invention will be made clearer by the following description, with reference to the accompanying drawings, in which.

DETAILED DESCRIPTION OF THE INVENTION

With reference to FIGS. 1 to 4, a brief summary will be given of the general features of conventional high-pressure mixing devices according to the art discussed previously.

Figure 1:
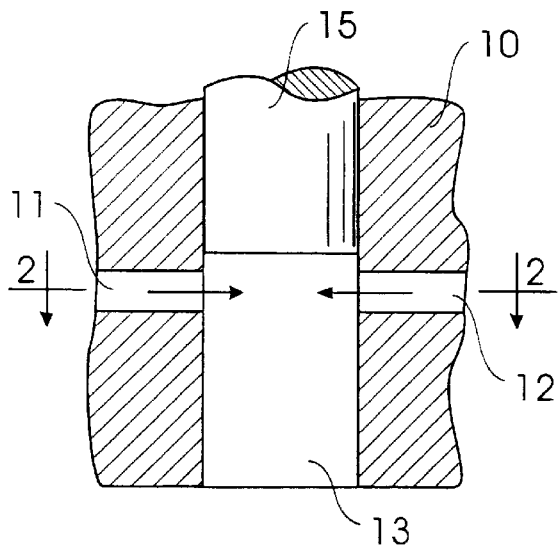
FIG. 1 is a schematic view of a portion of a conventional mixing apparatus.
Figure 2:
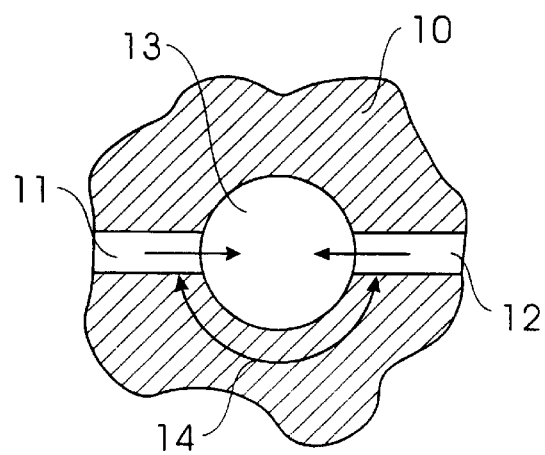
FIG. 2 is a cross-sectional view along line 2—2 of FIG. 1.

In particular, FIGS. 1 and 2 show the fundamental parts of a known mixing device for two-component mixing. The device comprises a body 10 having a cylindrical chamber 13 in which two nozzles 11 and 12 for injecting polyurethane components open radially in diametrically opposite positions in relation to the longitudinal axis of the mixing chamber 13. Reference numeral 15 denotes a cleaning member connected in a known manner to a hydraulic drive cylinder and movable between open and closed positions. In the open position, shown in FIG. 1, the two nozzles 11 and 12 open towards the mixing chamber 13. In the closed forward position, the cleaning member 15 expels residue of the polyurethane mixture from the chamber 13 and connects the injection nozzles 11 and 12 to appropriate recycling grooves in the same cleaning member 15.

As shown in FIG. 2, the two nozzles 11 and 12 are arranged radially and opposite on a same diameter of the chamber 13, at an angular spacing of approximately 180°, indicated by the double arrow 14. This spacing is generally sufficient for enabling a good seal and for preventing the seepage of one polyurethane component into the recycling circuit of the other, when the cleaning member 15 is moved forwards to close the chamber 13.

Figure 3:
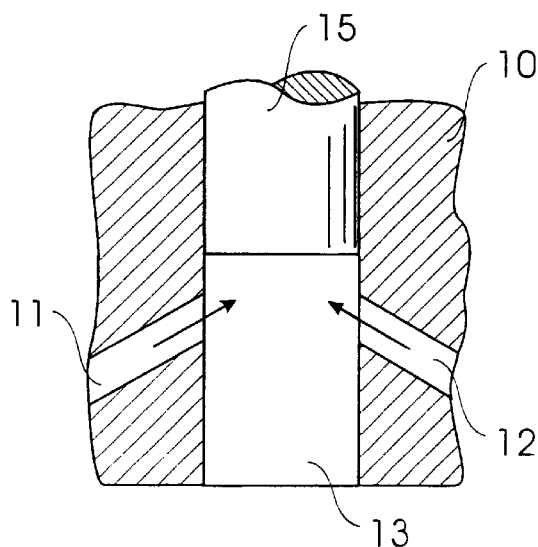
FIG. 3 is a schematic view of another conventional mixing apparatus.

FIG. 3 shows a device similar to that of FIG. 1, except that the injection nozzles 11 and 12, instead of being perpendicular to the axis of the mixing chamber 13, are slanted towards the bottom of the same chamber 13 in the direction of the cleaning member 15. This slanting arrangement causes a reversion of the flow and greater turbulence for mixing. However, in this case too, the arrangement of the injection nozzles 11 and 12 is similar to that of the previous example.

Figure 4:
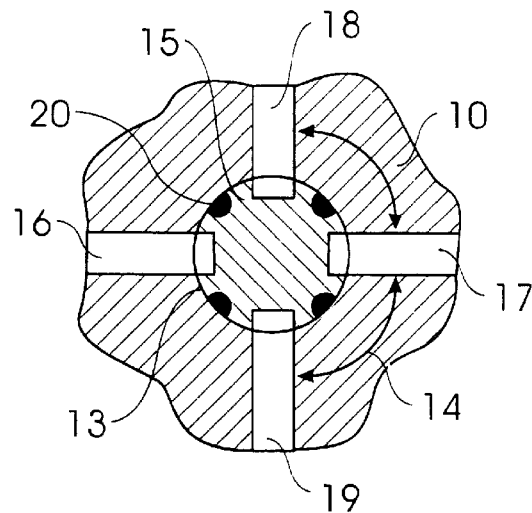
FIG. 4 is a cross-sectional view similar to that of FIG. 2, for yet another conventional mixing apparatus.

FIG. 4 shows a device in which four injection nozzles 16, 17, 18 and 19 are provided, again radially arranged, in opposite pairs. The angular spacing between two adjacent nozzles, again indicated by the double arrows 14, is equal to or less than 90°. The angular spacing is inadequate for ensuring a good seal between the same nozzles in the recycling condition of the device, i.e., such as to prevent seepage of one polyurethane-forming component into the circuit of another, when the various components are recycled towards respective storage tanks via suitable grooves in the cleaning member 15. Therefore, it is necessary to implement some laborious techniques, for example by forming special longitudinal seals 20 on the cleaning member 15, in an intermediate position to the recycling grooves, as schematically shown.

Figure 5:
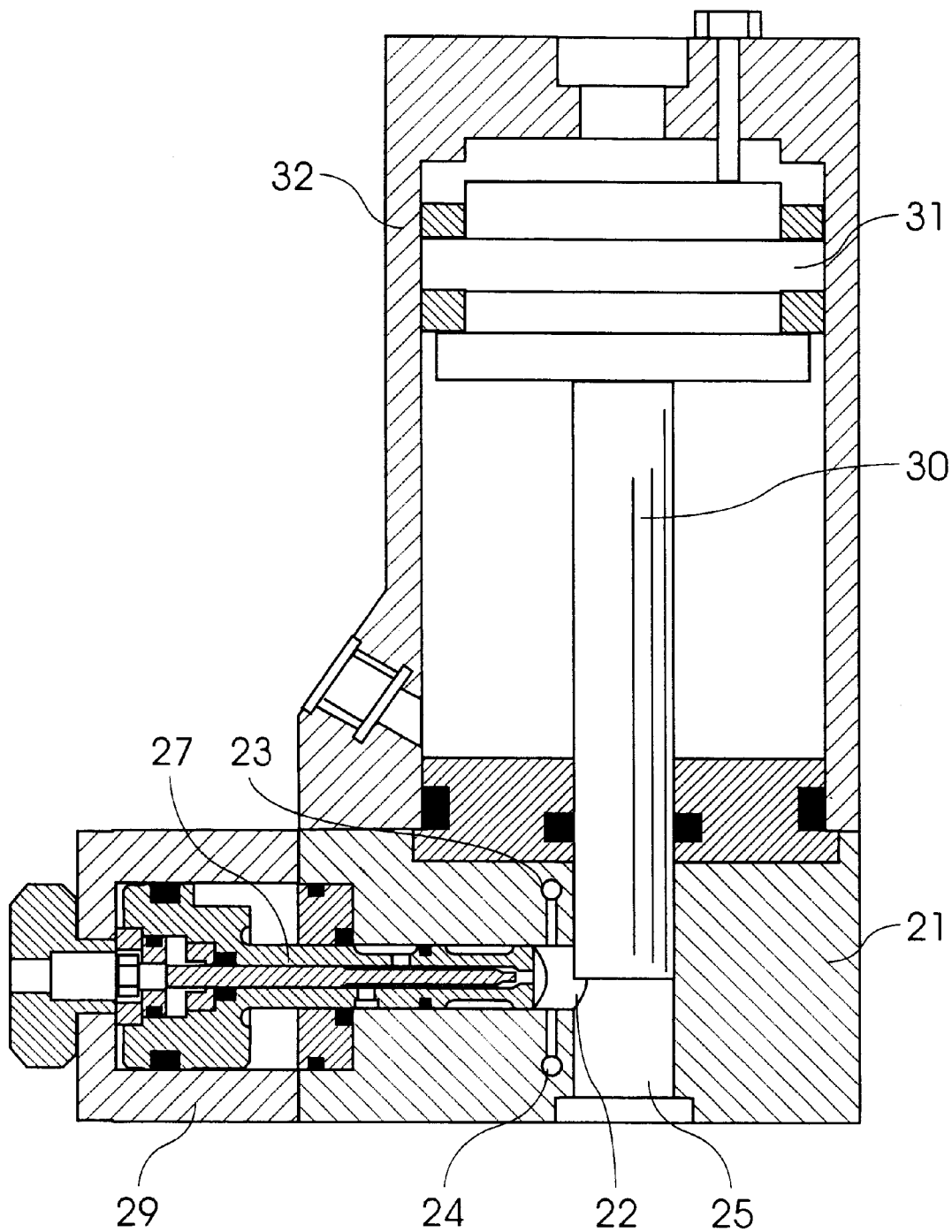
FIG. 5 is a longitudinal view of an apparatus according to an embodiment of the present invention.
Figure 6:
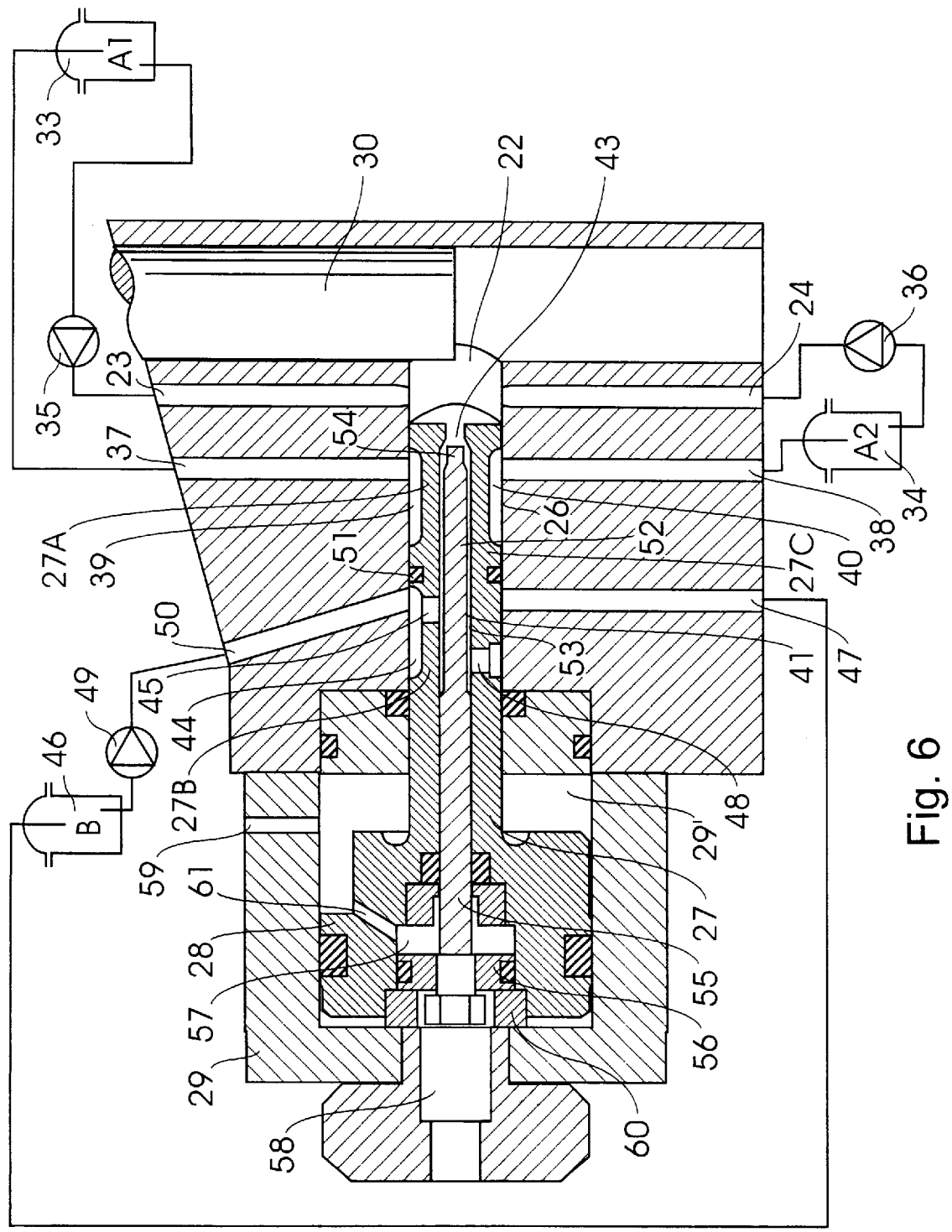
FIG. 6 is an enlarged view of a region of the apparatus of FIG. 5.

The embodiment of the present invention illustrated in FIGS. 5 and 6 is directed to a high-pressure mixing apparatus, of the self-cleaning type, which uses a mixing-chamber cleaning member as a valve. The cleaning member is constructed and arranged to permit selective and controlled feeding of a primary polyurethane component in an axial direction to the mixing chamber, that is, in a direction perpendicular to the radial flow of the other remaining components. In this embodiment, good seal conditions between the recycling grooves are ensured and risk of seepage is eliminated.

As shown in FIG. 5, the mixing apparatus comprises a body 21 provided with a mixing chamber 22 into which two radial nozzles 23 and 24 open. The nozzles 23 and 24 serve, for example, to feed two opposite flows of the same component or different types of a reactive component (e.g., polyols) and/or additives, according to the type of polyurethane formulation used.

The mixing chamber 22 in turn opens towards a discharge conduit 25 arranged perpendicular to or forming an angle with the longitudinal axis of the mixing chamber 22. The discharge conduit 25 serves to supply the resulting mixture into a mold (not 20 shown).

The dimensions, configurations, and relative arrangements of the mixing chamber 22 and the discharge conduit 25 can be modified in relation to what is shown in the illustrated embodiment. The mixing chamber 22 is preferably in the form of a cylindrical chamber of small volume, with a smaller diameter than that of the discharge conduit 25, and has an axial length which is preferably equal to or less than 2–2.5 times its diameter.

The mixing chamber 22 extends to the rear (to the left in FIG. 6) into a cylindrical hole 26 (FIG. 6) of substantially the same diameter. A cleaning member 27 slidable into the cylindrical hole 26 is provided. The cleaning member 27 is constructed and arranged to perform a valving function of opening and closing the various injection nozzles (described below) and to permit recycling of the polyurethane components.

The cleaning member 27 is connected to a pressurized-fluid-actuated control device such as a piston 28 of a hydraulic cylinder 29 in order to be moved between open and closed positions. In the rearward open position, shown in FIGS. 5 and 6, the cleaning member 27 opens the various nozzles for injecting the polyurethene-precursor components into the mixing chamber 22. In the forward closed position, the cleaning member 27 closes the nozzles from the mixing chamber.

A second cleaning member 30 is operable in the discharge conduit 25. The second cleaning member 30 is connected to the piston 31 of a respective hydraulic cylinder 32, which permits movement of the second cleaning member 30 between a backward position, shown in FIG. 5, in which the second cleaning member 30 frees the outlet of the mixing chamber 22, and a forward position in which the second cleaning member 30 closes the mixing chamber 22 and ejects the residual mixture from the discharge conduit 25.

In the illustrated embodiment, the two hydraulic cylinders 29 and 32 are of the double-acting type and can be connected to a source of pressurized oil by an appropriate valve system, which effectively may govern the operation of the entire apparatus. Moreover, as shown in FIG. 5, in order to improve mixing, the outlet of the mixing chamber 22 can be throttled so that the flow of the mixture leaving the chamber 22 is mixed further conduit 25. The throttling of the outlet of the chamber 22 can be obtained by any suitable means. It is however preferable to use the same cleaning member 30 of the discharge conduit 25 for throttling the outlet of the chamber 22. In this respect the control cylinder 32 can be provided with an adjustable stop means for the piston 31, schematically shown in FIG. 5 by a screw (unnumbered) which is screwed in the back wall of the cylinder 32.

As referred to previously, the nozzles 23 and 24 open radially in the mixing chamber 22 and are arranged to feed two opposing flows as indicated by A1 and A2 and in FIG. 6. The flows may include the same primary polyurethane component A, preferably a polyol, if necessary premixed with various additives, or may include different polyols or a total pre-polymer. Another primary polyurethane component B, such as isocyanate or a primary additive which is chemically reactive with the first component(s) A, is fed through a longitudinal hole in the cleaning member 27 and to the mixing chamber 22.

Each of the nozzles 23 and 24 is connected to a respective tank 33 and 34 for storing the component, via a respective batching pump 35 and 36 in a manner which is substantially known.

Reference numerals 37 and 38 in the various drawings also denote the conduits for recycling the components. The conduits 37 and 38 are connectable to respective injection nozzles 23 and 24 via respective recycling grooves 39 and 40 formed longitudinally to the cleaning member 27. In the rearward closed position, the cleaning member 27 defines the bottom of the mixing chamber 22.

As referred to previously, at least one additional polyurethane component B, such as another of the primary polyurethane components, preferably the isocyanate, for example an isocyanate based on TDI or MDI, or a primary additive such as chemical water, is fed through the cleaning member 27 axially to the mixing chamber 22 when the cleaning member 27 is in a rearward open position in relation to the nozzles 23 and 24. According to the present invention, the component B is injected axially in the mixing chamber perpendicularly to the radial nozzles 23 and 24. The component B is fed through a longitudinal passage 41 in the cleaning member 27, which opens towards the mixing chamber 22 through a nozzle or orifice 43.

The passage 41 for feeding the polyurethane component B extends from the front portion of the cleaning member 27, beyond a front recycling zone 27A for chemicals in which recycling grooves 39 and 40 are provided, towards and slightly beyond a second recycling zone 27B and a further longitudinal groove 44. The groove 44 is used for feeding the chemical component B to the mixing chamber 22 through the longitudinal passage 41. The groove 44 is connected to the passage 41 by a radial hole 45. The groove 44 also serves to recycle the component B towards a storage tank 46, through a conduit 47 which communicates with the passage 41 via a second radial hole 48 on the opposite side of the radial hole 45. Other constructions and arrangements are possible, without prejudice to the general principles described above. For example, instead of the single groove 44, two grooves and/or separate holes could be provided for feeding and for recycling the component.

Reference numeral 49 denotes a batching pump which feeds the polyurethane component B from the tank 46 towards the feed conduit 50 which opens into the groove 44.

According to the present invention, various valves are provided for controlling both the feeding and recycling of all the polyurethane components. For example, the front zone 27A recycles the polyurethane components A which are fed directly into the mixing chamber via the radial nozzles 23, 24. A second zone 27B, to the rear and axially spaced from the first zone 27A, includes the groove 44 formed and arranged for feeding and recycling the polyurethane component B which is fed via the cleaning member 27, axially to the mixing chamber 22.

The recycling grooves 39/40 and 44 of the two recycling zones 27A and 27B are separated one from the other by an intermediate sealing zone 27C, which extends axially for a short length. The sealing zone 27C prevents any risk of seepage of the component B in the recycling circuit with one or both components A1 and A2. In order to improve the sealing conditions, at the intermediate zone 27C one or more annular gaskets 51 can be provided, for example at least one O-ring which imparts a good seal between the groove 44 of the second recycling zone 27B, and the grooves 39 and 40 of the first recycling zone 27A. In this way a perfect seal is ensured for a long period of operation of the mixing apparatus.

The cleaning member 27 of the mixing chamber 22 also performs a valving function for the component B, which is injected axially into the mixing chamber 22. In the longitudinal passage 41 of the cleaning member 27, a co-axially arranged valve element 52 slides and extends axially between the recycling zones 27A and 27B. The valve element 52 has a smaller diameter than that of the passage 41. The valve element 52 and the cylindrical wall of the passage 41 define an elongated annular chamber 53 therebetween. The annular chamber 53 opens towards the injection nozzle 43.

The valve element 52, as shown in FIG. 6, terminates at its front end with a cylindrical tip 54 having the same length and the same diameter as the nozzle 43. In this manner, insertion of the tip 54 into the nozzle 43 cleans the nozzle 43.

The valve element 52 can be reciprocated in the passage 41, and in tandem with the cleaning member 27 by means of its own hydraulic actuator, which can be driven synchronously with the hydraulic actuator 29 of the cleaning member 27.

The valve element 52 extends at the rear to define a stem 55 connected to the piston 56 of a second hydraulic actuator formed coaxially and inside the piston 28 of the hydraulic actuator 29. In this manner, both of the actuators are connected to a single source of pressurized fluid for in-phase control of the cleaning member 27 and the internal valve element 52. In particular, as shown, the second hydraulic actuator comprises a chamber 57 directly inside the piston 28, in which the piston 56 reciprocates. The second hydraulic actuator 56, 57 is therefore arranged coaxially to the inside of the first hydraulic actuator 28, 29 so that both hydraulic actuators can be actuated in the same phase, via a connection to a single fluid pressure source. In practice this is accomplished by connecting the inner actuator 56, 57 of the valve element 52 to the source of pressurized fluid indirectly via the same chamber 29' of the hydraulic actuator 29.

In this respect the two sides of the chamber 29' of the hydraulic actuator 29 can be connected alternatively to the pressure source via inlet/outlet apertures 58, 59. The two sides of the chamber of the second hydraulic actuator 56, 57, can in turn be connected indirectly to the same pressure source, through passages which open on corresponding sides of the chamber 29' of the first actuator. More precisely, the chamber of the second hydraulic actuator 56, 57 can be connected on one side to the aperture 58 of the first actuator, through a central hole of an annular element 60 screwed in the rear part of the piston 28, while it is connected to the other aperture 59, through the same chamber 29' and a hole 61 in the wall of the piston 28.

The operation of the apparatus is described below. When the valve element 52 and the cleaning member 27 are in their respective forward or advanced positions, the injection nozzles 23, 24 and 43 are closed, allowing the recycling of the polyurethane components to the respective storage tanks 33, 34 and 46. Further, any seepage or leakage of a polyurethane component into the recycling circuit of the other is prevented by the seal in the intermediate zone 27C of the cleaning member 27.

When a mixing phase and feeding of the polyurethane mixture into the cavity of a mold is to be performed, the pressurized oil is fed to the aperture 59 of the chamber of the cylinder 29, while the aperture 58 is connected to the drain. The pressurized oil is immediately transmitted inside the chamber of the second hydraulic actuator provided by the same piston 28 of the actuator of the cleaning member 27.

Since the piston 56 has an extremely light weight, the valve element 52 is immediately moved backwards, and simultaneously the backward stroke of the piston 28 of the cleaning member 27 will also start until the cleaning member 27 moves into the retracted condition shown in FIG. 6. The sequence of the movements, both in one direction and in the other, will occur in phase and in a controlled manner, enabling the opening or simultaneous closure of the various injection nozzles, and strict control over the stoichiometric ratios of the various polyurethane components right from the start of their injection and mixing phases.

Although the mixing apparatus according to the present application is suitable for the production of polyurethane foams of TDI and MDI based formulations, this invention is also particularly suitable for producing a polyurethane mixture starting from a total pre-polymer as previously defined. The pre-polymer may be fed in a substantially radial direction into the mixing chamber 22 through an injection nozzle 23 and/or 24. Simultaneously, a primary component such as, for example, water may be axially injected from the bottom of the mixing chamber 22 in close proximity to the injector 23, 24, through the axial duct 41 provided in the cleaning member 27.

A self-cleaning, mixing apparatus and method for the production of polyurethane formulations with the apparatus are disclosed in priority documents Italian application No. MI97A001207 filed May 22, 1997 and Italian application No. MI98A00185, the complete disclosures of each of which are incorporated herein by reference.

The foregoing detailed description of the preferred embodiments of the invention has been provided for the purposes of illustration and description. It is not intended to be exhaustive or to limit the invention to the precise embodiments disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What we claim is:

1. A high-pressure self-cleaning mixing apparatus adapted to mix at least one pre-polymer and at least one additive reactive with the pre-polymer to form a mixture and feed the mixture to a mold, said apparatus comprising:

a discharge duct;

a body having a mixing chamber angularly disposed relative to said discharge duct, a first-valve guiding hole incorporating said mixing chamber, and at least one pre-polymer feed passage and at least one additive feed passage, said pre-polymer feed passage being constructed and arranged to feed the pre-polymer from a pre-polymer source into said mixing chamber so that the pre-polymer enters said mixing chamber along a radial direction of said mixing chamber;

a first valve member having a longitudinal axis and being movable in said first-valve guiding hole relative to said body between open and closed positions, at least a portion of said first valve member having a longitudinally-extending passage and an associated orifice formed therethrough, said longitudinally-extending passage and said associated orifice being constructed and arranged to communicate said additive feed passage with said mixing chamber and thereby feed the additive from an additive source into said mixing chamber so that said additive enters said mixing chamber along an axial direction of said mixing chamber;

a second valve member receivable in said longitudinally-extending passage, said second valve member being both slidable relative to said longitudinally-extending passage and said associated orifice and operable to control the flow of the additive into said mixing chamber; and a hydraulic actuator operatively connected to said first and second valve members and selectively connectable to a fluid source, wherein when said first valve member is in the open position, said pre-polymer feed passage feeds the pre-polymer to said mixing chamber so that the pre-polymer enters said mixing chamber along the radial direction of said mixing chamber and said additive feed passage feeds the additive through said longitudinally-extending passage and said associated orifice and into said mixing chamber so that said additive enters said mixing chamber along the axial direction of said mixing chamber.

2. An apparatus according to claim 1, wherein said second valve member comprises a stem portion having a smaller diameter than said longitudinally-extending passage of said first valve member so as to define an annular chamber between said stem portion and a passage-defining surface of said first valve member, and wherein said second valve member further comprises a cleaning tip portion insertable into said orifice.

3. An apparatus according to claim 1, wherein:
said hydraulic actuator comprises first and second cylinder-piston arrangements operatively connected to said first and second valve members, respectively;
each of said first and second cylinder-piston arrangements comprises a piston member with a piston chamber; and
wherein said piston chamber of said second cylinder-piston arrangement is provided in said piston member of said first cylinder-piston arrangement.

4. An apparatus according to claim 1, wherein said first valve member comprises longitudinally-extending peripherally-positioned recycle grooves which are longitudinally spaced from each other to seal said recycle grooves from each other.

5. An apparatus according to claim 4, wherein at least one sealing member is disposed between said longitudinally-extending peripherally-positioned recycle grooves.

6. A high-pressure self-cleaning mixing apparatus adapted to mix at least first and second reactive polyurethane-forming components and feed the mixed components to a mold, said apparatus comprising:
a body having a mixing chamber with a longitudinal axis, a cleaning-member guiding hole that incorporates said mixing chamber, at least first and second feed passages, and at least first and second recycle passages,
a cleaning member movably receivable within said cleaning-member guiding hole and having a longitudinal axis and at least first and second longitudinally-extending peripherally-positioned recycle grooves longitudinally spaced and sealed from each other, at least a portion of said cleaning member having a longitudinally-extending passage and an associated outlet orifice, said cleaning member being movable relative to said body between an open position and a closed position,
wherein when said cleaning member is in the open position, said first feed passage communicates with said mixing chamber to permit the first polyurethane-forming component to be fed radially into said mixing chamber, and said longitudinally-extending passage and said associated orifice communicate said second feed passage with said mixing chamber to permit the second polyurethane-forming component to be fed axially into said mixing chamber, and
wherein when said cleaning member is in the closed position, said first feed passage and said second feed passage are respectively prevented from feeding the first polyurethane-forming component and the second polyurethane-forming component to said mixing chamber.

7. An apparatus according to claim 6, wherein said orifice is narrower than said longitudinally-extending passage.

8. An apparatus according to claim 6, wherein said cleaning member further comprises a valve member disposed in said longitudinally-extending passage and operable to control the flow of the second polyurethane-forming component into said mixing chamber.

9. An apparatus according to claim 8, wherein said valve member is movable between a first position in which said second feed passage feeds the second polyurethane-forming component through said longitudinally-extending passage and said associated orifice and into said mixing chamber along the axial direction of said mixing chamber, and a second position in which said valve member obstructs said orifice.

10. An apparatus according to claim 9, wherein said valve member comprises a longitudinally-extending element movable relative to said longitudinally-extending passage of said cleaning member, and further wherein said cleaning member and said longitudinally-extending element are operatively connected to respective first and second fluid-pressurized actuators, which are selectively connectable to a pressurized-fluid source.

11. An apparatus according to claim 10, wherein:
said first fluid-pressurized actuator is a first double-acting hydraulic actuator having a piston chamber and a reciprocating piston member connected to said cleaning member;
said second fluid-pressurized actuator is a second double-acting hydraulic actuator co-axially arranged in said piston member of said first hydraulic actuator and cooperatively associated with said longitudinally-extending element; and
said second actuator has fluid passages opening on opposing sides into said piston chamber for connecting said second hydraulic actuator to said pressurized-fluid source.

12. An apparatus according to claim 10, wherein said longitudinally-extending element comprises a stem portion having a smaller diameter than that of said longitudinally-extending passage of said cleaning member, wherein an annular chamber is defined between said stem portion and an inner surface of said longitudinally-extending passage of said cleaning member, wherein said cleaning member has a radial hole communicating said second feed passage with said annular chamber, and further wherein said annular chamber extends from said radial hole to said outlet orifice when said cleaning member is in the open position.

13. An apparatus according to claim 6, wherein when said cleaning member is in the closed position, said first recycle groove communicates said first feed passage with said first recycle passage to prevent the first polyurethane-forming component from feeding into said mixing chamber, and said second recycle groove communicates said second feed passage with said second recycle passage.

14. An apparatus according to claim 13, wherein at least one sealing member is interposed between said first groove and said second groove to seal said first feed and recycle passages from said second feed and recycle passages.

15. An apparatus according to claim 6, wherein said mixing chamber opens into an angularly oriented discharge duct.

16. An apparatus according to claim 15, further comprising a throttling means for throttling an outlet opening of said mixing chamber.

17. An apparatus according to claim 16, wherein said throttling means is adjustable.

18. An apparatus according to claim 17, wherein said throttling means comprises a cleaning member of said discharge duct.

19. An apparatus according to claim 6, wherein the first feed passage is slanted at an angle relative to the longitudinal axis of said mixing chamber.

20. A method for the production of a polyurethane mixture with a high-pressure self-cleaning mixing apparatus from at least first and second reactive polyurethane-forming components, said method comprising:

(a) providing an apparatus comprising:
- (i) a body having a mixing chamber with a longitudinal axis, a cleaning-member guiding hole incorporating the mixing chamber, at least first and second feed passages, and at least first and second recycle passages,
- (ii) a cleaning member movably receivable within the cleaning-member guiding hole of the body and having a longitudinal axis and at least first and second longitudinally-extending peripherally-positioned recycle grooves that are longitudinally spaced and sealed from each other, at least a portion of the cleaning member having a longitudinally-extending passage and an associated outlet orifice, the cleaning member being movable relative to the body between an open position and a closed position, wherein when the cleaning member is in the closed position the first feed passage and the second feed passage are respectively prevented from feeding the first polyurethane-forming component and the second polyurethane-forming component to the mixing chamber;

(b) placing the cleaning member in the open position so that the first feed passage communicates with the mixing chamber, and so that the longitudinally-extending passage and the associated orifice communicate the second feed passage with the mixing chamber;

(c) feeding the first polyurethane-forming component from the first feed passage into the mixing chamber along a radial direction of the mixing chamber; and (d) feeding the second polyurethane-forming component from the second feed passage into the mixing chamber along an axial direction of the mixing chamber.

21. A method according to claim 20, wherein when the cleaning member is in the closed position, the first recycle groove communicates the first feed passage with the first recycle passage to prevent the first polyurethane-forming component from feeding into the mixing chamber, and the second recycle groove communicates the second feed passage with the second recycle passage.

22. A method according to claim 20, wherein the second polyurethane-forming component has a lower viscosity than the first polyurethane-forming component.

23. A method according to claim 22, wherein the second polyurethane-forming component is an isocyanate, and the first polyurethane-forming component is a polyol.

24. A method according to claim 23, wherein the second polyurethane-forming component is selected from the group consisting of TDI and MDI.

\* \* \* \* \*